US012637107B2

(12) United States Patent
Oveisi et al.

(10) Patent No.: US 12,637,107 B2
(45) Date of Patent: May 26, 2026

(54) METHOD FOR CONTROLLING AN AUTONOMOUS COMMERCIAL VEHICLE WHEN TRANSPORTING OVERSIZED LOADS

(71) Applicant: DAIMLER TRUCK AG, Leinfelden-Echterdingen (DE)

(72) Inventors: Atta Oveisi, Fellbach (DE); Eeran Maiti, Böblingen (DE); Tobias Schwalb, Leinfelden-Echterdingen (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 149 days.

(21) Appl. No.: 18/597,211

(22) Filed: Mar. 6, 2024

(65) Prior Publication Data

US 2024/0300535 A1 Sep. 12, 2024

(30) Foreign Application Priority Data

Mar. 7, 2023 (DE) ...................... 10 2023 105 643.3

(51) Int. Cl.
B60W 60/00 (2020.01)
B60W 30/09 (2012.01)
B60W 40/10 (2012.01)

(52) U.S. Cl.
CPC ........ B60W 60/0015 (2020.02); B60W 30/09 (2013.01); B60W 40/10 (2013.01);
(Continued)

(58) Field of Classification Search
CPC ............. B60W 60/0015; B60W 30/09; B60W 2300/145; B60W 2300/125; B60W 2300/13; B60W 40/10
See application file for complete search history.

(56) References Cited

U.S. PATENT DOCUMENTS 11,577,729 B2 2/2023 Mielenz
2020/0339126 A1* 10/2020 Mielenz .............. G05D 1/0212
(Continued)

FOREIGN PATENT DOCUMENTS

DE 102019001956 A1 * 2/2020 ...... B60W 30/18145
DE 102019205957 A1 10/2020

OTHER PUBLICATIONS

Machine Translation of Stein's reference (DE-102019001956-A1) (Year: 2020).*
(Continued)

*Primary Examiner* — Tarek Elarabi
(74) *Attorney, Agent, or Firm* — PATENT PORTFOLIO BUILDERS PLLC

(57) ABSTRACT

An autonomous commercial vehicle transporting oversized loads is controlled based on sensor data determined by environment sensors of the commercial vehicle and/or data of a digital map. Navigable areas including lanes in the direction of and against the direction of travel and hard shoulders are determined in the form of respective polygons, in which the autonomous commercial vehicle may be present. The behavior of the autonomous commercial vehicle is determined depending on the navigable areas, objects identified on the basis of the sensor data, and an intrinsic movement estimation. At least one corridor command is transmitted to a movement planning module, which plans a trajectory and/or a path of the commercial vehicle with avoidance of a collision with identified objects. The planned trajectory and/or the planned path are/is fed to a movement control module, which controls the autonomous commercial vehicle such that it follows the planned trajectory and/or the planned path.

6 Claims, 4 Drawing Sheets

Figure 1:
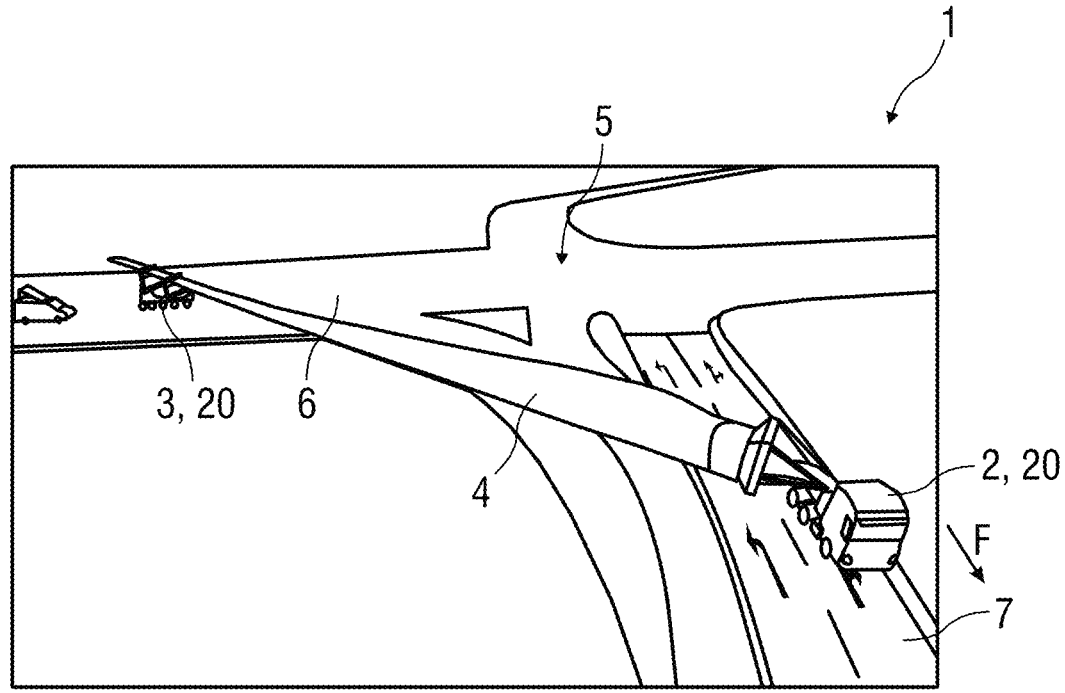

(52) U.S. Cl.
 CPC . *B60W 2300/145* (2013.01); *B60W 2420/403*
  (2013.01); *B60W 2420/408* (2024.01); *B60W*
  *2520/06* (2013.01); *B60W 2552/10* (2020.02);
  *B60W 2554/402* (2020.02); *B60W 2556/35*
  (2020.02); *B60W 2556/40* (2020.02)

(56)               References Cited

U.S. PATENT DOCUMENTS

| | | | |
|---|---|---|---|
| 2022/0299994 A1* | 9/2022 | Wood | G05D 1/0246 |
| 2024/0067510 A1* | 2/2024 | Ulbrich | B66F 9/063 |
| 2024/0300535 A1* | 9/2024 | Oveisi | G08G 1/167 |

OTHER PUBLICATIONS

Examination Report dated Nov. 23, 2023 in related/corresponding
German Application No. 10 2023 105 643.3.

* cited by examiner

METHOD FOR CONTROLLING AN AUTONOMOUS COMMERCIAL VEHICLE WHEN TRANSPORTING OVERSIZED LOADS

CROSS-REFERENCE TO RELATED APPLICATIONS

This application claims priority under 35 U.S.C. § 119 to German patent application DE 10 2023 105 643.3, filed on Mar. 7, 2023, the entire content of which is herein expressly incorporated by reference.

BACKGROUND AND SUMMARY OF THE INVENTION

Exemplary embodiments of the invention relate to a method for controlling an autonomous commercial vehicle when transporting oversized loads.

Autonomous driving of commercial vehicles is known primarily in the form of platooning (also known as electronic towing) and hub-to-hub transport. The primary advantage of such applications is that they do not necessarily have anything to do with the challenges of urban traffic. Known solutions are just as unable to cope with specific transport tasks, such as the autonomous transport of oversized loads. In the context of the present application, oversized objects are objects that do not normally fit in or on a trailer or semi-trailer of standard size, for example turbine blades for wind turbines.

Other examples of oversized loads are, for example, larger construction machinery (baggers, wheeled loaders) or larger concrete and/or metal components for industry, etc. The safety of such a heavy goods vehicle having a plurality of units becomes a challenge as a result of unknown characteristics of the load, for example its center of gravity. The vehicle geometry can therefore vary depending on the distribution of the load, the height of the center of gravity, and the dynamics of the trailer or semi-trailer and of the tires. The likelihood of safety-critical situations and accidents may increase due to the unusual geometry, provided no further adjustment is made.

US 2022/299994 A1 describes a control system of a self-propelled tractor unit, which control system can access sensor data in order to determine a set of trailer configuration parameters of a freight trailer coupled to the self-propelled tractor unit. Based on the set of trailer configuration parameters, the control system can configure a movement planning mode for autonomous control of the acceleration, braking and steering systems of the tractor unit.

Exemplary embodiments of the invention are directed to a novel method for controlling an autonomous commercial vehicle when transporting oversized loads.

In a method for controlling an autonomous commercial vehicle when transporting oversized loads, on the basis of sensor data determined by environment sensors of the commercial vehicle and/or on the basis of data of a digital map, navigable areas including lanes in the direction of travel and against the direction of travel as well as hard shoulders are determined in the form of respective polygons, in which the autonomous commercial vehicle may be present, wherein a behavior module determines the behavior of the autonomous commercial vehicle depending on the navigable areas, depending on objects identified on the basis of the sensor data, and depending on an intrinsic movement estimation, and transmits at least one corridor command to a movement planning module which plans a trajectory and/or a path of the commercial vehicle with avoidance of a collision with identified objects, wherein the planned trajectory and/or the planned path are/is fed to a movement control module, which controls the autonomous commercial vehicle such that it follows the planned trajectory and/or the planned path.

In the context of the present invention, a corridor means a virtual lane on the carriageway or the ground that the commercial vehicle is to follow.

In one embodiment, the polygons in a drivable surface generator module are merged to form a polygon compound to determine the navigable area.

In one embodiment, the commercial vehicle has a tractor unit and a trailer or semi-trailer. The oversized load can be disposed between the tractor unit and the trailer.

In one embodiment, the behavior module has a first behavior group that generates a corridor command to keep the tractor unit and the trailer within lane boundaries delimited by the polygon. The behavior module has a second behavior group that generates a corridor command to keep the tractor unit and trailer within the boundaries of navigable areas defined by the polygon compound.

In one embodiment, a corridor command decision-maker is provided, which decides to use the corridor command of the second behavior group if an oversized trailer or semi-trailer is attached and/or an oversized load is being transported. Otherwise, the corridor command decision-maker decides to use the corridor command of the first behavior group.

In one embodiment, the first behavior group defines a lane behavior, a merge behavior, a positioning behavior, a highway courtesy behavior, a junction behavior, and a minimum risk maneuver behavior, wherein the second behavior group defines a positioning behavior and a minimum risk maneuver behavior.

In one embodiment, sensor fusion is carried out in a fusion module for estimating the intrinsic state of the commercial vehicle and for object detection and object classification.

In one embodiment, the fusion module is supplied with sensor data from one or more lidar sensors, radar sensors and/or one or more cameras, which are arranged in a suitable manner to detect the surroundings of the commercial vehicle.

In one embodiment, one or more object containers, which are assigned to identified objects, and a movement estimation are transferred from the fusion module to the behavior module.

In one embodiment, a parameter server is provided which adapts the geometry of the commercial vehicle and dynamic coefficients into one or more functions, in particular into corridor command decision-maker, movement planning module, and movement control module functions.

The movement planning module and the movement control module can be left unchanged or almost unchanged as a result of this new architecture.

BRIEF DESCRIPTION OF THE DRAWING FIGURES

Figure 2:
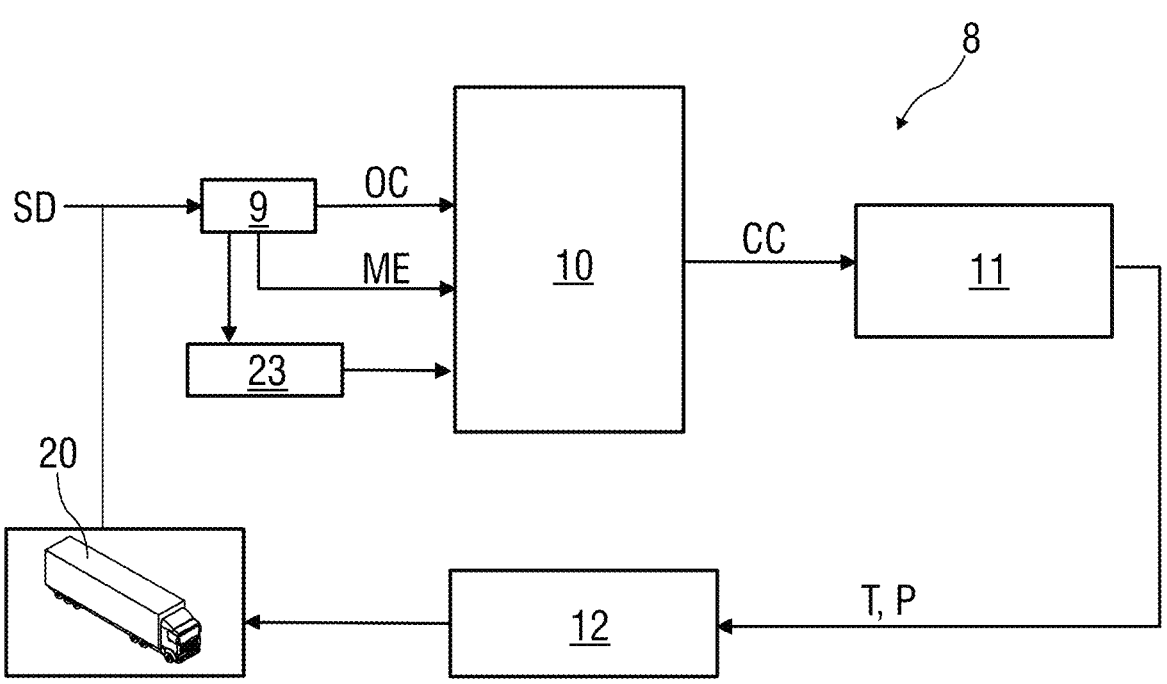
Figure 3:
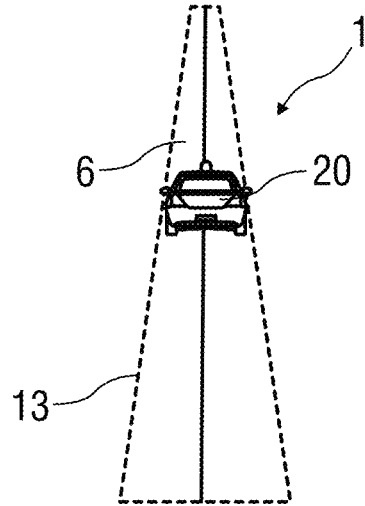
Figure 4:
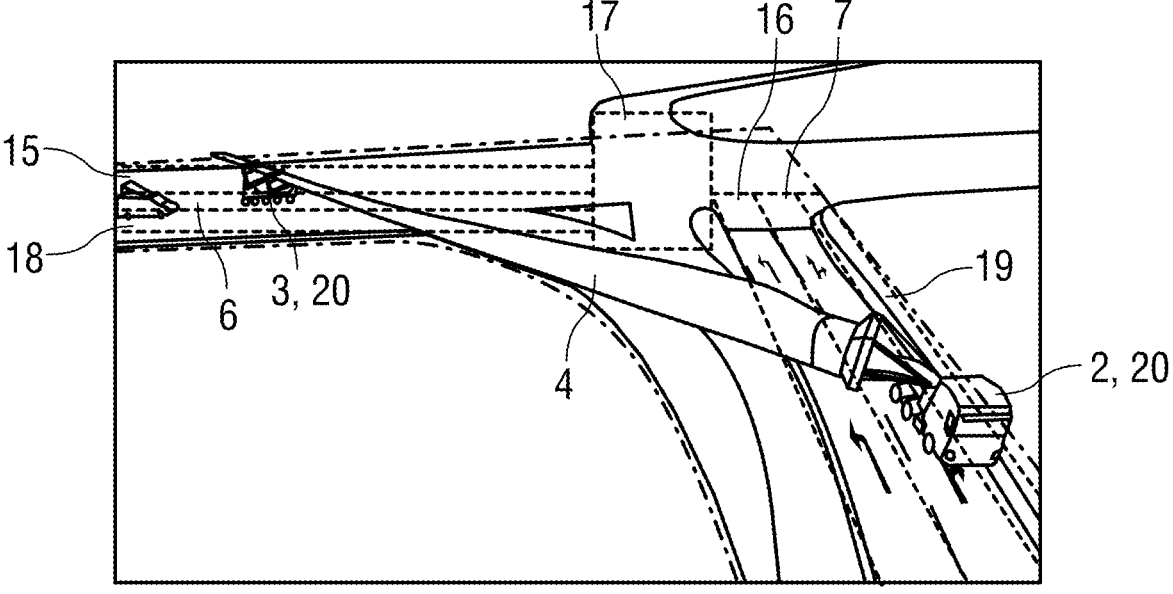
Figure 5:
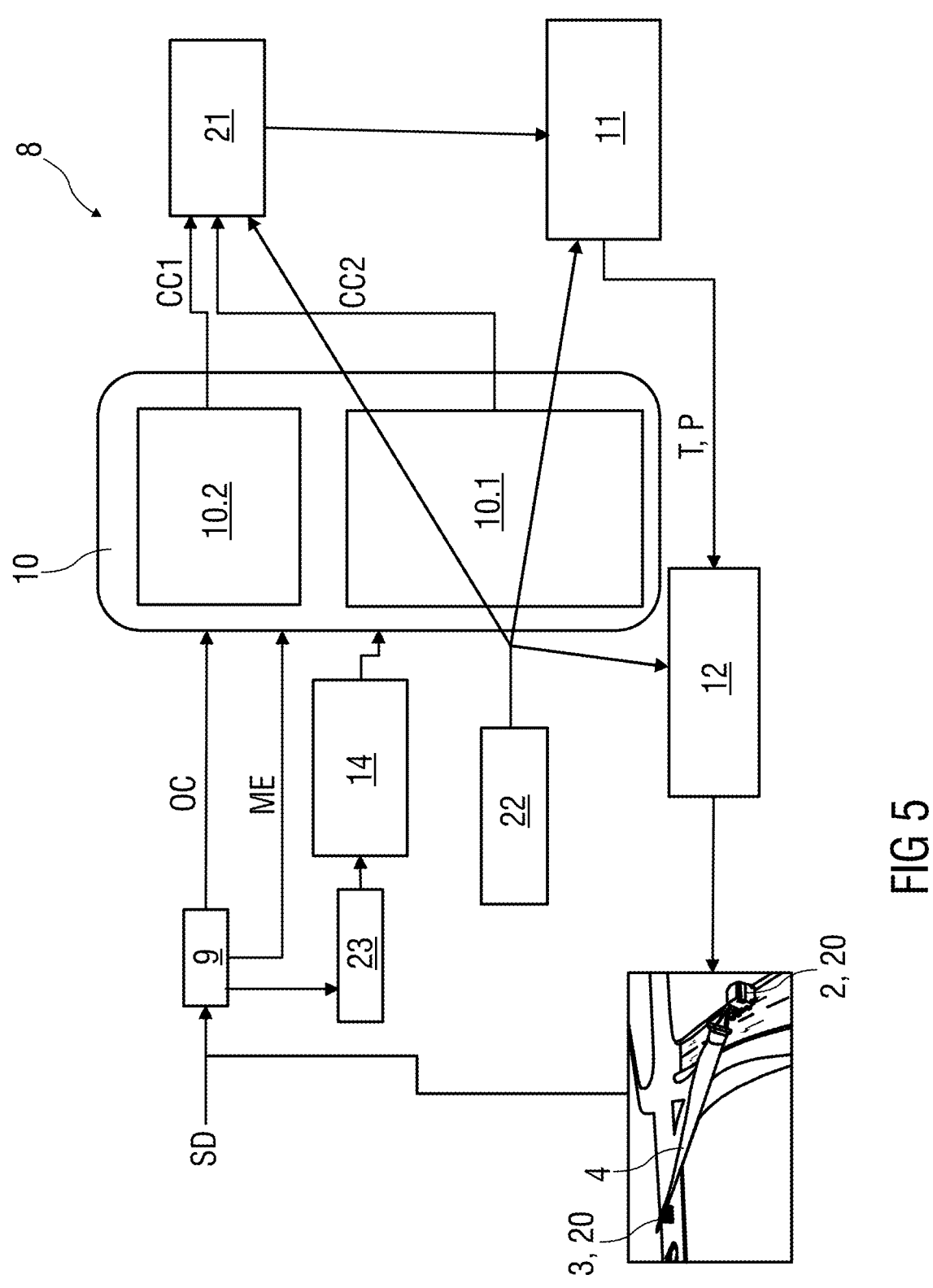

Exemplary embodiments of the invention are explained in greater detail below with reference to drawings, in which:

FIG. 1 shows a schematic view of a traffic situation with a tractor unit and a trailer transporting an oversized load, FIG. 2 shows a schematic view of a virtual driver according to the prior art, FIG. 3 shows a schematic view of a traffic situation with a vehicle located in a rectangular polygon defining a lane, FIG. 4 shows a schematic view of the traffic situation from FIG. 1 to illustrate the mode of operation of a modified virtual driver, and FIG. 5 shows a schematic view of the modified virtual driver.

Corresponding parts are provided with the same reference signs in all figures.

DETAILED DESCRIPTION

The present invention deals with special transport tasks such as the autonomous transport of oversized loads.

In order for the autonomous driver (referred to herein and hereinafter as the virtual driver) to be able to handle such a complex scenario, the dynamic response of the vehicle in standard scenarios, for example lane changes, double lane changes and other emergency maneuvers, must be predicted. The present invention is concerned with a behavior and planning module in the virtual driver, considers the main constraints for handling oversized objects and proposes a novel method for predicting the lane position of the vehicle. These key indicators can be used to predict possible sources of potential accidents and to avoid such accidents when operating an autonomous commercial vehicle.

Oversized goods transport in the case of Level 4 and 5 autonomous driving becomes a challenging task due to the conventions on which the industry is based. In a virtual driver, it is typically avoided that the tractor unit and the trailer or semi-trailer remain in different lanes. However, with oversized loads this is sometimes unavoidable.

FIG. 1 is a schematic view of a traffic situation 1 with a vehicle 20, in particular a commercial vehicle combination, comprising a tractor unit 2 and a trailer 3 or semi-trailer transporting an oversized load 4, in this case a turbine blade for a wind turbine. One end of the load 4 rests on the tractor unit 2 and the opposite end rests on the trailer 3. When turning off at a junction 5, the trailer 3 is still in a lane 6 leading to the junction 5, while the tractor unit 2 has already turned off at the junction 5 and is in a lane 7 that may not normally be used for its direction of travel F.

In the virtual driver 8 (shown in FIG. 2), implemented standard behaviors such as consideration for maintaining distances to other lanes (highway courtesy) and lane corridor planner cannot therefore be used. The highway courtesy function describes how the virtual driver takes other road users into consideration and, for example, allows them to merge into the lane or does not potentially block them during driving maneuvers. This is difficult with oversized loads, as it would severely restrict maneuvering options.

While high-resolution maps provide precise information about lanes, accesses and exits, they cannot be used in the usual way to plan a path of the vehicle 20 and its behavior. For example, in an autonomous commercial vehicle 20 with the conventional tractor unit 2 and trailer 3 or semitrailer configuration, the objective of the planner is to keep both the tractor unit 2 and trailer 3 centered in the same lane 6, 7 while maintaining a safe lateral distance from vehicles in adjacent lanes (this is referred to in the literature as highway courtesy behavior).

However, as can be seen in FIG. 1, this is not possible with an oversized load 4. Another example is lane corridor planning, in which a planned route, especially a high-level route, can only find a suitable path between two points A and B using the behavior module if all road traffic regulations are complied with. High-level planning first plans which lanes and which junctions are to be used. High-level planning also takes into account when (or in which road section) a lane change must be carried out. However, no precise steering movements are planned here. In the case of oversized loads, however, certain points can and/or must be ignored during planning, such as the direction of travel of the lane. While this is the only acceptable mode of operation for normal applications of autonomous commercial vehicle operation, this is not the case for oversized loads 4, such as turbine blades for wind turbines, as it may be necessary for the tractor unit 2 to drive in lanes 7 that are reserved for an opposite direction of travel.

In order to extend autonomous driving to applications involving the transport of oversized loads 4, corresponding changes are required.

The present invention therefore proposes a novel architecture for the virtual driver to enable them to handle trailers 3 of any length and size.

For this purpose, a state transition logic is proposed to activate and/or deactivate the different behaviors in the virtual driver 8.

FIG. 2 is a schematic view of a virtual driver 8 according to the prior art.

A fusion module 9 is supplied with sensor data SD from a number of sensors of the commercial vehicle 20, for example one or more lidar sensors, radar sensors and/or one or more cameras, and fused there. One or more object containers OC, which can be assigned to identified objects, and a movement estimation ME are transferred from the fusion module 9 to a behavior module 10. The state transition logic is implemented in this behavior module 10. It switches between a normal behavior, in which, for example, the vehicle only drives in its own lane, and a special behavior, in which, for example, the direction of travel can be ignored. A defined transition must take place between the two behaviors.

Depending on the data received from the fusion module 9 and a map node 23, the behavior module 10 determines the behavior of the autonomous vehicle 20, for example including lane behavior, merge behavior, positioning behavior, highway courtesy behavior, junction behavior and minimum risk maneuver behavior. Map node 23 contains a highly accurate map of the surroundings with extended information, such as lanes, navigable areas, hard shoulders, height information or lane lines. The map node 23 mainly receives a position from the fusion module 9, but also other data such as lane lines, which have been recognized from the sensor data SD (for example by means of a camera). The map node 23 compares this with stored data in order to determine a highly accurate position. The map node 23 provides the behavior module 10 with additional information on this position, such as the navigable areas, so that the behavior module 10 can determine a corridor and take the navigable areas into account. The map node 23 can also be referred to as an environment map module. The merge behavior describes a lane change, for example. In this case, the vehicle normally drives into the moving and/or flowing traffic in a neighboring lane. However, this lane change can also take place completely without other vehicles. The minimum risk maneuver behavior describes an emergency maneuver in the event of a problem (for example insufficient drive power of the vehicle), in which case the vehicle assumes a state in which it poses the least possible danger to other road users. For example, the vehicle parks at the edge of the carriageway or stops in the lane on a straight stretch, preferably not behind a brow point and/or bend. The behavior module 10 can be designed to determine other types of behavior.

The behavior module 10 transmits a corridor command CC to a movement planning module 11. The movement planning module 11 plans a trajectory T and/or a path P of the vehicle 20 while avoiding collisions with identified objects. The path P is a spatial course of the planned journey. The trajectory T is a spatial and temporal course of the planned journey.

The planned trajectory T and/or the planned path P are fed to a movement control module 12, which controls the autonomous vehicle 20 so that it follows the planned trajectory T and/or the planned path P.

In a preferred embodiment, the sensors are arranged in a manner suitable for the combination of tractor unit 2 and trailer 3, so that a consistent sensor fusion is available for estimating the intrinsic state of the vehicle 20 and for object detection and classification.

Based on this premise, the objectives of the corridor command CC are the variables that need to be changed. The objectives are a type of argument or parameter transferred with the corridor command CC. An example of this is to move the destination within the lane so that the movement planner takes this into account when planning. The variables represent the points that should be changed if the load is oversized. For example, it is usually less important to drive in the lane than to avoid touching other objects. This is more complex with bulky oversized loads. Accordingly, a corridor in this context, as the most important output value of the behavior module 10, means a virtual lane on the roadway or ground that the vehicle 20 is to follow. In a motorway scenario, such a corridor coincides with the actual lane 6, 7. However, when changing lanes, the aforementioned corridor actually refers to a virtual lane that gently guides the vehicle 20 from one real lane to another real lane.

As the dynamics of the heavy goods vehicle consisting of several units are similar to those of a combination of tractor unit 2 and trailer 3, only one parameter server in the virtual driver 8 needs to be adapted for a suitable estimation of intrinsic states. The parameter server contains several parameter sets (related parameters), which are applied depending on the load and/or situation. These relate, for example, to the size and center of gravity of the load. Parameter sets can be provided that have delivered good results from experience and/or the past and are therefore stored as a kind of "preselection" and can be called up. The estimated states for the behavior and planning design in the prior art serve as input values for the function development.

Deviating from highway courtesy behavior and lane behavior, which normally ensure to keep the vehicle 20, i.e., the tractor unit 2 and the trailer 3, in the same lane 6, 7, it is proposed according to the present invention to consider the entire driving surface, i.e., lanes 6, 7 and hard shoulder, as a single unit that can use the corridor command CC.

To achieve this goal, each lane 6, 7 and each hard shoulder is treated as a polygon 13. Polygons 13 are generally used to describe the geometry of roads and are generally applied as interfaces between the behavior module 10 and the movement planning module 11. An example of such a polygon 13 in a lane-keeping scenario on a straight road would be a rectangle that defines the lateral boundaries of the lane 6, 7 and has sufficient longitudinal extent to allow the vehicle 20 to move forwards or backwards. FIG. 3 is a schematic view of a traffic situation 1 with a vehicle 20 located in a rectangular polygon 13 defining the lane 6, 7.

The merging of polygons 13 to create a polygon compound containing all lanes 6, 7 from left to right, including the hard shoulders, simplifies the behaviors or criteria. In other words, the main objective is to keep the tractor unit 2 and the trailer 3 within the navigable surfaces, neglecting the remaining targets.

It is therefore proposed to modify the architecture of the virtual driver 8 based on a drivable surface generator module 14, the operation of which is illustrated schematically in FIG. 4.

In FIG. 4, the drivable surface generator module 14 forms a polygon compound of all lanes 6, 7, 15, 16, a junction area 17 and the hard shoulders 18, 19. It should be noted that for travelling with oversized loads 4, even lanes 7, 16 with the opposite direction of travel are included as navigable surfaces.

FIG. 5 is a schematic view of a correspondingly modified virtual driver 8, which is configured to handle both normal scenarios and scenarios with an excessive load 4 during autonomous driving.

In FIG. 5, the drivable surface generator module 14 is designed as a functional module that generates a single polygon 13 or a single polygon compound, within which both the tractor unit 2 and the trailer 3 and/or the load 4 may be located.

Therefore, the positioning behavior in the behavior module 10, which is normally configured in a first behavior group 10.1 to keep the tractor unit 2 and the trailer 3 within the lane boundaries (corridor command boundaries delimited by the polygon 13), is adapted in a second behavior group 10.2 to keep the tractor unit 2 and the trailer 3 within the boundaries of navigable areas defined by the polygon compound.

Furthermore, a corridor command decision-maker 21 is provided, which decides which of the two corridor commands CC1, CC2 from the first behavior group 10.1 or from the second behavior group 10.2 is used, depending on whether an oversized trailer 3 is attached and/or an oversized load 4 is being transported or not.

Accordingly, some behaviors, such as highway courtesy behavior, lane behavior, a merge behavior and junction behavior are deactivated in behavior group 10.2, as such oversized loads 4 are transferred under the escort of safety vehicles that block the road for other road users. The navigable area can be interpreted as an enclosed area.

The movement planning module 11 and the movement control module 12 can be left unchanged or almost unchanged as a result of this new architecture.

The parameter server 22 is configured to adjust the geometry of the vehicle 20 and dynamic coefficients in the corridor command decision-maker 21, movement planning module 11 and movement control module 12 functions. The geometry of the oversized vehicle is communicated to the functions. The data can be transmitted to the virtual driver from a database containing information on the load before the journey begins. This corresponds, for example, to an electronic version of the load documents.

The proposed solution extends the virtual driver 8 to enable it to handle oversized loads 4 with minimal changes.

Behaviors such as the minimum risk maneuver behavior, which are part of the core area of ASIL-D certification, remain unchanged, as the parameter server 22 adapts the aforementioned functionality to the new geometry. Only the parameters stored in the parameter server are adapted for the individual (oversized) load, not the functions themselves. The functions then work with the adapted parameters, but remain unchanged even within the scope of their certification.

Safety-relevant maneuvers, such as corridor planning and the corresponding movement control for slip roads, can be carried out without accidents.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 1 traffic situation
2 tractor unit
3 trailer
4 load
5 junction
6 lane
7 lane
8 virtual driver
9 fusion module
10 behavior module
10.1, 10.2 behavior group
11 movement planning module
12 movement control module
13 polygon
14 drivable surface generator module
15 lane
16 lane
17 junction region
18 hard shoulder
19 hard shoulder
20 vehicle, commercial vehicle
21 corridor command decision-maker
22 parameter server
23 map node/digital map
CC, CC1, CC2 corridor command
F direction of travel
ME movement estimation
OC object container
P path
SD sensor data
T trajectory

What is claimed is:

1. A method for controlling an autonomous commercial vehicle when transporting oversized loads, the method comprising:

determining, based on sensor data determined by environment sensors of the autonomous commercial vehicle or on data of a digital map, navigable areas including lanes in a direction of travel of the autonomous commercial vehicle, against the direction of travel of the autonomous commercial vehicle, and hard shoulders, wherein the determined navigable areas are determined in a form of respective polygons in which the autonomous commercial vehicle may be present, the respective polygons including at least a first polygon including the lanes in the direction of travel of the autonomous commercial vehicle, a second polygon including the lanes against the direction of travel of the autonomous commercial vehicle, and a third polygon including hard shoulders;

determining, by a behavior module, a behavior of the autonomous commercial vehicle depending on the determined navigable areas, objects identified based on the sensor data, and an intrinsic movement estimation;

transmitting, by the behavior module to a movement planning module, at least one corridor command;

planning, by the movement planning module, a trajectory or a path of the autonomous commercial vehicle that avoids a collision with identified objects based on the at least one corridor command; and controlling, by a movement control module of the autonomous commercial vehicle based on the planned trajectory or the planned path, the autonomous commercial vehicle such that the autonomous commercial vehicle follows the planned trajectory or the planned path, wherein the respective polygons are merged by a drivable surface generator module to form a compound polygon in order to determine the navigable areas, wherein the autonomous commercial vehicle has a tractor unit and a trailer or semi-trailer, wherein the behavior module has a first behavior group that generates a corridor command to keep the tractor unit and the trailer within lane boundaries delimited by the first polygon, and the behavior module has a second behavior group that generates a corridor command to keep the tractor unit and trailer within the boundaries of navigable areas defined by the compound polygon, wherein a corridor command decision-maker decides to use the corridor command of the second behavior group if an oversized trailer or semi-trailer is attached or an oversized load is being transported, and in the corridor command decision-maker otherwise uses the corridor command of the first behavior group, and wherein the first behavior group defines a lane behavior, a merge behavior, a positioning behavior, a highway courtesy behavior, a junction behavior, and a minimum risk maneuver behavior, wherein the second behavior group defines a positioning behavior and a minimum risk maneuver behavior.

2. The method of claim 1, wherein a sensor fusion module performs sensor fusion to generate the intrinsic movement estimate and performs object detection and object classification.

3. The method of claim 2, wherein the fusion module is supplied with sensor data from one or more lidar sensors, radar sensors, or one or more cameras.

4. The method of claim 2, wherein one or more object containers, which are assigned to identified objects, and a movement estimation are transferred from the fusion module to the behavior module.

5. The method of claim 1, wherein a parameter server adapts a geometry of the autonomous commercial vehicle and dynamic coefficients into one or more functions.

6. The method of claim 5, wherein the one or more functions are corridor command decision-maker, movement planning module, and movement control module functions.

* * * * *